United States Patent
Liu

(10) Patent No.: US 12,217,510 B2
(45) Date of Patent: Feb. 4, 2025

(54) REGION MANAGEMENT AND CONTROL METHOD, DEVICE, APPARATUS AND STORAGE MEDIUM

(71) Applicant: BOE Technology Group Co., Ltd., Beijing (CN)

(72) Inventor: Tong Liu, Beijing (CN)

(73) Assignee: BOE Technology Group Co., Ltd., Beijing (CN)

(*) Notice: Subject to any disclaimer, the term of this patent is extended or adjusted under 35 U.S.C. 154(b) by 569 days.

(21) Appl. No.: 17/511,423

(22) Filed: Oct. 26, 2021

(65) Prior Publication Data
US 2022/0164581 A1 May 26, 2022

(30) Foreign Application Priority Data
Nov. 24, 2020 (CN) .......................... 202011334338.2

(51) Int. Cl.
*G06V 20/52* (2022.01)
*G01J 5/00* (2022.01)
(Continued)

(52) U.S. Cl.
CPC ............ *G06V 20/53* (2022.01); *G01J 5/0025* (2013.01); *G06V 10/25* (2022.01); *G06V 40/103* (2022.01);
(Continued)

(58) Field of Classification Search
CPC ...... G06V 20/53; G06V 10/25; G06V 40/103; G06V 40/172; G06V 20/52; G06V 40/20;
(Continued)

(56) References Cited

U.S. PATENT DOCUMENTS 8,332,951 B2 * 12/2012 Chakra ............... G06F 21/6218
718/1
10,846,966 B2 * 11/2020 Saso ........................ G07C 9/37
(Continued)

FOREIGN PATENT DOCUMENTS

| CN | 107766830 A | 3/2018 |
| CN | 107808502 A | 3/2018 |

(Continued)

OTHER PUBLICATIONS

CN 202011334338.2 first office action dated Dec. 27, 2024.

*Primary Examiner* — Michael S Osinski
(74) *Attorney, Agent, or Firm* — IPro, PLLC

(57) ABSTRACT

The present application provides a region management and control method, device, apparatus and storage medium. The region management and control method includes: obtaining a current image in a video image and a target region graphic included in the current image; determining whether a person graphic in the current image and the target region graphic meet a predetermined condition; and sending alarm information in response to the person graphic in the current image and the target region graphic meeting the predetermined condition. The predetermined condition includes at least one of: a space condition, a person identity condition, a time condition, a person protection condition, a person number condition or a person body temperature condition.

15 Claims, 3 Drawing Sheets

(51) Int. Cl.
  *G06V 10/25* (2022.01)
  *G06V 40/10* (2022.01)
  *G06V 40/16* (2022.01)
(52) U.S. Cl.
  CPC .... *G06V 40/172* (2022.01); *G01J 2005/0077* (2013.01)
(58) Field of Classification Search
  CPC .... G06V 40/10; G06V 10/255; G06V 40/168; G06V 10/22; G06V 40/174; G01J 5/0025; G01J 2005/0077; G01J 5/025; H04N 7/181; H04N 7/18; H04N 7/188; G08B 13/19602; G08B 21/02; G06T 2207/30196; G06T 2207/30232; G06T 2207/30241; G06T 7/11; G06T 7/248; G06T 2207/20081
  See application file for complete search history.

(56) References Cited

U.S. PATENT DOCUMENTS

| | | | | |
|---|---|---|---|---|
| 10,891,465 | B2* | 1/2021 | Tian | G06V 10/82 |
| 11,148,642 | B2* | 10/2021 | Hallberg | G06F 21/82 |
| 11,842,523 | B2* | 12/2023 | Subramanian | G06T 7/248 |
| 11,854,266 | B2* | 12/2023 | Nadler | G06V 20/52 |
| 2007/0001835 | A1* | 1/2007 | Ward | G08B 13/248 340/522 |
| 2009/0324010 | A1 | 12/2009 | Hou | |
| 2015/0249688 | A1* | 9/2015 | Sambamurthy | G06F 21/60 726/1 |
| 2015/0278608 | A1* | 10/2015 | Matsumoto | G06V 40/23 348/143 |
| 2016/0295171 | A1* | 10/2016 | Van Den Brink | G06V 20/52 |
| 2017/0046891 | A1* | 2/2017 | Trivelpiece | G07C 9/00309 |
| 2018/0040223 | A1* | 2/2018 | Bodi | G08B 21/18 |
| 2018/0157915 | A1* | 6/2018 | Sherry | H04N 21/84 |
| 2018/0349708 | A1* | 12/2018 | Van Hoof | G08B 13/19684 |
| 2019/0272738 | A1* | 9/2019 | Hutz | G08B 13/196 |
| 2020/0042772 | A1* | 2/2020 | Feng | G06F 18/22 |
| 2020/0104591 | A1* | 4/2020 | Zucker | G06Q 10/0833 |
| 2020/0105407 | A1* | 4/2020 | Soreefan | G08B 21/0461 |
| 2020/0387716 | A1* | 12/2020 | Nadler | G06V 40/16 |
| 2020/0410224 | A1* | 12/2020 | Goel | G05D 1/0212 |
| 2021/0327086 | A1* | 10/2021 | Xu | G06T 7/70 |
| 2021/0404877 | A1* | 12/2021 | Lee | G06V 40/171 |
| 2022/0031258 | A1* | 2/2022 | Xing | A61B 5/742 |
| 2022/0083767 | A1* | 3/2022 | Subramanian | G06Q 30/0201 |
| 2022/0114377 | A1* | 4/2022 | Subramanian | G06V 40/10 |
| 2022/0122361 | A1* | 4/2022 | Nadler | G06V 10/22 |
| 2022/0189280 | A1* | 6/2022 | Singh | G08B 21/182 |
| 2022/0319178 | A1* | 10/2022 | Carter | G06V 20/52 |
| 2023/0103768 | A1* | 4/2023 | Minoura | G06T 7/60 348/143 |
| 2023/0306833 | A1* | 9/2023 | Yoshizawa | G06T 7/11 |
| 2023/0307138 | A1* | 9/2023 | Nakano | G06Q 10/0635 |
| 2023/0336864 | A1* | 10/2023 | Komiya | G03B 15/00 |
| 2023/0419670 | A1* | 12/2023 | Nakamura | G06V 40/103 |
| 2024/0087281 | A1* | 3/2024 | Subramanian | G06V 40/10 |
| 2024/0096158 | A1* | 3/2024 | Ikeda | G01J 5/0025 |

FOREIGN PATENT DOCUMENTS

| | | |
|---|---|---|
| CN | 107818651 A | 3/2018 |
| CN | 109063612 A | 12/2018 |
| CN | 110751007 A | 2/2020 |
| CN | 111083640 A | 4/2020 |
| DE | 102008039130 A1 | 2/2010 |

* cited by examiner

REGION MANAGEMENT AND CONTROL METHOD, DEVICE, APPARATUS AND STORAGE MEDIUM

CROSS-REFERENCE TO RELATED APPLICATIONS

The present application claims a priority to the Chinese patent application No. 202011334338.2 filed in China on Nov. 24, 2020, a disclosure of which is incorporated herein by reference in its entirety.

TECHNICAL FIELD

The present application relates to the field of region management and control technologies. Specifically, the present application relates to a region management and control method, device, apparatus and storage medium.

BACKGROUND

Daily life often involves monitoring of certain regions. For example, in scenarios such as smart parks, office buildings, government departments, there are certain specific regions that require key management and control, such as financial rooms, fire channels, monitoring rooms and executive offices, and only specific persons can visit at a specific time. Management and control of these regions are usually to manually watch a surveillance video in real time, which not only requires a lot of work, a long time and a high labor cost, but also cannot detect illegal intrusion in time all the time, and thus cannot effectively manage and control of a target region.

SUMMARY

In a first aspect, one embodiment of the present disclosure provides a region management and control method, including: obtaining a current image in a video image and a target region graphic included in the current image; determining whether a person graphic in the current image and the target region graphic meet a predetermined condition; and sending alarm information in response to the person graphic in the current image and the target region graphic meeting the predetermined condition. The predetermined condition includes at least one of: a space condition, a person identity condition, a time condition, a person protection condition, a person number condition or a person body temperature condition.

In one possible implementation, the determining whether a person graphic in the current image and the target region graphic meet a predetermined condition, includes: determining a minimum enclosing rectangle of the person graphic in the current image; wherein the minimum enclosing rectangle is a minimum rectangle containing the person graphic in the current image; and in a case that there is an intersection between the minimum enclosing rectangle and the target region graphic, determining that the person graphic in the current image and the target region graphic meet the space condition.

In one possible implementation, the determining whether a person graphic in the current image and the target region graphic meet a predetermined condition, includes: determining person identity information of the person graphic in the current image; in a case that there is an intersection between the person graphic and the target region graphic, determining, according to the person identity information corresponding to the person graphic, whether preset persons allowed to enter the target region include a person corresponding to the person graphic; and determining that the person graphic in the current image and the target region graphic meet the person identity condition, in response to that the preset persons do not include the person corresponding to the person graphic.

In one possible implementation, the determining person identity information of the person graphic in the current image, includes: setting a number for the person corresponding to the person graphic appearing in the video image, and tracking the person graphic of the person in the video image according to the number of the person; and, in a case that front face information appears in the person graphic in the current image, obtaining the front face information, and determining, according to the front face information, the person identity information corresponding to the person graphic in the current image, and binding the person identity information to the number of the person. The determining, according to the person identity information corresponding to the person graphic, whether preset persons allowed to enter the target region include a person corresponding to the person graphic, includes: in a case that the person graphic intersects with the target region graphic, according to the number of the person corresponding to the person graphic, determining the person identity information corresponding the person graphic; and, according to the person identity information and identity information of the preset persons, determining whether the preset persons allowed to enter the target region include the person corresponding to the person graphic. The determining that the person graphic in the current image and the target region graphic meet the person identity condition, in response to that the preset persons do not include the person corresponding to the person graphic, includes: in response to that the person identity information is inconsistent with the identity information of the preset persons, determining that the person graphic in the current image and the target region graphic meet the person identity condition in the predetermined condition. The sending alarm information in response to the person graphic in the current image and the target region graphic meeting the predetermined condition, includes: in response to that the person graphic in the current image and the target region graphic meet the person identity condition in the predetermined condition, sending the alarm information and sending the front face information to a background server.

In one possible implementation, the determining whether a person graphic in the current image and the target region graphic meet a predetermined condition, includes: in a predetermined time period, in a case that there is an intersection between the person graphic in the current image and the target region graphic, determining that the person graphic in the current image and the target region graphic meet the time condition in the predetermined condition; or, in a predetermined time period, in a case that there is an intersection between the person graphic in the current image and the target region graphic as well as the person identity condition is met, determining that the person graphic in the current image and the target region graphic meet the time condition and the person identity condition.

In one possible implementation, the determining whether a person graphic in the current image and the target region graphic meet a predetermined condition, includes: in a case that there is an intersection between the person graphic in the current image and the target region graphic, determining whether protection component information in the person graphic meets predetermined person protection information;

in response to the protection component information not meeting the predetermined person protection information, determining that the person graphic in the current image and the target region graphic meet the person protection condition.

In one possible implementation, the determining whether a person graphic in the current image and the target region graphic meet a predetermined condition, includes: determining, among person graphics in the current image, the number of person graphics that intersect with the target region graphic; in a case that the number of person graphics is greater than a preset person number, determining that the person graphics in the current image and the target region graphic meet the person number condition.

In one possible implementation, the determining whether a person graphic in the current image and the target region graphic meet a predetermined condition, includes: in a case that there is an intersection between the person graphic in the current image and the target region graphic, determining a body temperature of a person corresponding to the person graphic; in a case that the body temperature of the person is greater than a body temperature preset value, determining that the person graphics in the current image and the target region graphic meet the person body temperature condition.

In one possible implementation, the obtaining a current image in a video image and a target region graphic included in the current image, includes: according to an identifier of the target region in the current image of the video image, determining the target region graphic in the current image; or, obtaining an editing operation on the current image of the video image, and taking an area selected by the editing operation as the target region graphic.

In a second aspect, one embodiment of the present disclosure provides a region management and control device, including: an obtaining circuit configured to obtain a current image in a video image and a target region graphic included in the current image; a judgment circuit configured to determine whether a person graphic in the current image and the target region graphic meet a predetermined condition; and a processing circuit configured to send alarm information in response to the person graphic in the current image and the target region graphic meeting the predetermined condition. The predetermined condition includes at least one of: a space condition, a person identity condition, a time condition, a person protection condition, a person number condition or a person body temperature condition.

In a third aspect, one embodiment of the present disclosure provides a region management and control apparatus, including: a processor, a memory in communication with the processor, and at least one program stored in the memory and configured to be executed by the processor. The at least one program is configured to implement the region management and control method in the first aspect.

In a fourth aspect, one embodiment of the present disclosure provides a region management and control system, including: at least one image capture device and the region management and control apparatus in the third aspect. The region management and control apparatus is in communication connection with the image capture device. A vision field of the image capture device includes a target region, and the image capture device is configured to capture a video image including a target region graphic.

In a fifth aspect, one embodiment of the present disclosure provides a non-transitory computer readable storage medium, including a computer program stored thereon. The computer program runs on a region management and control apparatus to implement the method in the first aspect.

Beneficial technical effects brought by the technical solutions provided by the embodiments of the present application are as follow.

The region management and control method of the embodiment of the present application can send the alarm information in response to the person graphic in the current image of the video image and the target region graphic meeting the predetermined condition, thereby realizing automatic monitoring of video images without the need to manually watch a surveillance video in real time, and then, illegal intrusions can be detected in real time, thereby realizing effective management and control of the target region.

The predetermined condition in the region management and control method of the embodiment of the present application includes at least one of the space condition, the person identity condition, the time condition, the person protection condition, the person number condition or the person body temperature condition, that is, the region management and control method of the embodiment of the present application can alarm for intrusions into a specific region in multiple dimensions such as space, identity, time, protection, person number and body temperature. That is, the alarm can be automatically triggered in response to a person appears in the image, thereby greatly improving management of the smart park.

Additional aspects and advantages of the present application will be given in the following description, which will become apparent from the following description, or be understood through practice of the present application.

BRIEF DESCRIPTION OF THE DRAWINGS

The foregoing and/or additional aspects and advantages of the present application will become apparent and easy to understand from the following description of the embodiments in conjunction with the accompanying drawings, in which.

DETAILED DESCRIPTION

Figure 1:
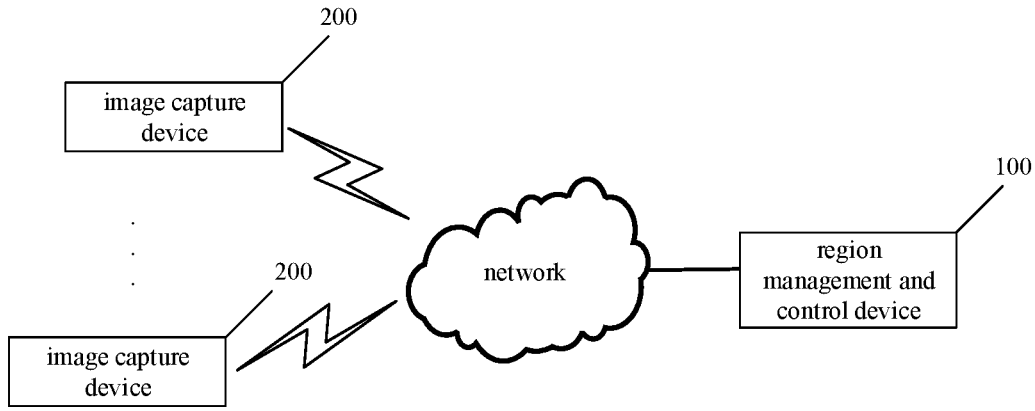
FIG. 1 is a schematic diagram of a region management and control system according to an embodiment of the present application.

The present disclosure is described in detail below. Examples of embodiments of the present disclosure are shown in the drawings, where the same or similar reference numerals indicate the same or similar components or components having the same or similar functions. Further, if detailed descriptions of known technologies are unnecessary for the illustrated features of the present disclosure, they are omitted. The embodiments described below with reference to the drawings are exemplary, and only used to explain the present disclosure, and cannot be construed as limiting the present disclosure.

It will be understood by those skilled in the art that, unless otherwise defined, all terms (including technical and scientific terms) used herein have the same meaning as commonly understood by one of ordinary skill in the art to which this disclosure belongs. It should also be understood that terms such as those defined in the general dictionary should be understood to have meanings consistent with the meanings in the context of the conventional technologies, and unless specifically defined herein, they would not be explained by idealized or overly formal meanings.

Those skilled in the art will understand that, unless specifically stated, otherwise, the singular forms of "a", "an", "the" and "said" may include plural forms. It should be further understood that the wording "including" used in the specification of the present disclosure refers to the presence of the described features, integers, steps, operations, elements and/or components, but does not exclude the presence or addition of one or more other features, integers, steps, operations, elements, components, and/or groups thereof. It should be understood that when an element is referred to as being "connected" or "coupled" to another element, it may be directly connected or coupled to the another element, or an intervening element may also be present. Furthermore, "connected" or "coupled" as used herein may include wireless connection or wireless coupling. The term "and/or" as used herein includes all or any of or all combinations of one or more of associated items as listed.

The technical solutions of the present application and how the technical solutions of the present application solve the foregoing technical problems will be described in detail below with specific embodiments.

One embodiment of the present application provides a region management and control system. As shown in FIG. 1, the region management and control system includes: a region management and control apparatus 100 and at least one image capture device 200. The region management and control apparatus 100 is in communication connection with the image capture device 200.

A vision field of the image capture device 200 includes a target region, and the image capture device 200 is configured to capture a video image including a target region graphic.

Optionally, the image capture device 200 is a monitoring device. A monitoring field of the monitoring device includes the target region, and the monitoring device is configured to monitor a condition of the target region in real time.

Optionally, the region management and control apparatus 100 includes a server. The server is configured to process in real time video images obtained from the image capture device 200 so as to monitor the condition of the target region in real time according to the video images, and send alarm information when the condition of the target region meets a predetermined condition.

Optionally, the region management and control apparatus 100 includes a display device in communication connection with the server. The display device is configured to display the video images and display the alarm information.

Optionally, the region management and control apparatus 100 may be in communication connection with an alarm device, and is configured to send the alarm information to the alarm device, so that the alarm device makes an alarm based on the alarm information.

Optionally, specific contents of a region management and control method implemented by the region management and control apparatus 100 of the embodiment of the present application is further introduced in a region management and control method of one embodiment of the present application in the following text.

The region management and control system of the embodiment of the present application is widely used in smart parks and security field. With the region management and control system of the embodiment of the present application, the alarm is automatically triggered in response to a person appear in an image.

Figure 2:
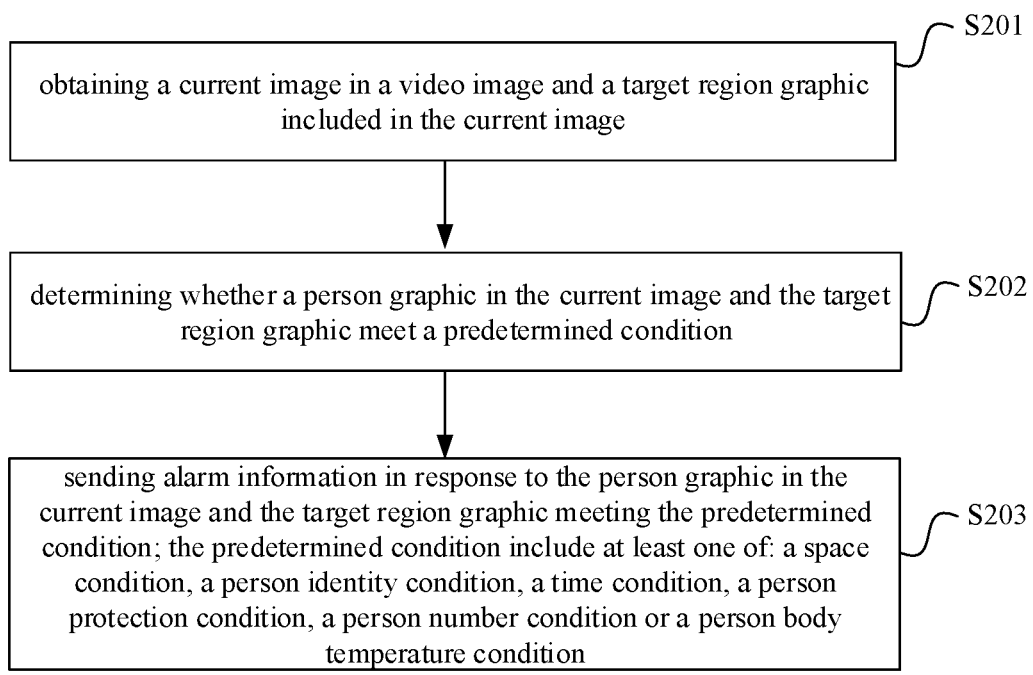
FIG. 2 is a flowchart of a region management and control method according to an embodiment of the present application.

One embodiment of the present application provides a region management and control method, which is applied to the region management and control apparatus 100 of the embodiment of the present application. As shown in FIG. 2, the region management and control method includes the following steps S201 to S203.

Step S201: obtaining a current image in a video image and a target region graphic included in the current image.

Optionally, the video image is obtained by the region management and control apparatus 100 from the image capture device 200.

Step S202: determining whether a person graphic in the current image and the target region graphic meet a predetermined condition. The predetermined condition includes at least one of: a space condition, a person identity condition, a time condition, a person protection condition, a person number condition or a person body temperature condition.

Step S203: sending alarm information in response to the person graphic in the current image and the target region graphic meeting the predetermined condition.

The region management and control method of the embodiment of the present application can send the alarm information in response to the person graphic in the current image of the video image and the target region graphic meeting the predetermined condition, thereby realizing automatic monitoring of video images without the need to manually watch a surveillance video in real time, and then, illegal intrusions can be detected in real time, thereby realizing effective management and control of the target region.

The predetermined condition in the region management and control method of the embodiment of the present application includes at least one of the space condition, the person identity condition, the time condition, the person protection condition, the person number condition or the person body temperature condition, that is, the region management and control method of the embodiment of the present application can alarm for intrusions into a specific region in multiple dimensions such as space, identity, time, protection, person number and body temperature. That is, the alarm can be automatically triggered in response to a person appears in the image, thereby greatly improving management of the smart park.

Optionally, the person graphic is a graphic part of a person in the current image; and the target region graphic is a graphic part of the target region in the current image.

Optionally, the predetermined condition may be at least one of the space condition, the person identity condition, the time condition, the person protection condition, the person number condition or the person body temperature condition, or a combination of any two or more thereof. In practical applications, the person identity condition, the time condition, the person protection condition, the person number condition and the person body temperature condition are judged in a case that a person enters the target region, i.e., being judged in a case that there is an intersection between the person graphic and the target region graphic.

In some embodiments, the step S202 of determining whether a person graphic in the current image and the target region graphic meet a predetermined condition, includes:

determining a minimum enclosing rectangle of the person graphic in the current image; where the minimum enclosing rectangle is a minimum rectangle containing the person graphic in the current image;

in a case that there is an intersection between the minimum enclosing rectangle and the target region graphic, determining that the person graphic in the current image and the target region graphic meet the space condition.

Optionally, the minimum enclosing rectangle is a minimum rectangular frame that encloses a body of a person. For example, when a person's feet step into the target region, the minimum enclosing rectangle in the current image intersects with the target region graphic, that is, the person is considered to have entered the target region. For another example, when a person's hand enters the target region, the minimum enclosing rectangle in the current image also intersects with the target region graphic, that is, the person is considered to have entered the target region.

In some embodiments, the determining whether a person graphic in the current image and the target region graphic meet a predetermined condition, includes:

determining person identity information of the person graphic in the current image;

in a case that there is an intersection between the person graphic and the target region graphic, according to the person identity information corresponding to the person graphic, determining whether preset persons allowed to enter the target region include a person corresponding to the person graphic; and in response to that the preset persons do not include the person corresponding to the person graphic, determining that the person graphic in the current image and the target region graphic meet the person identity condition.

In some embodiments, the determining person identity information of the person graphic in the current image, includes:

setting a number for a person corresponding to a person graphic appearing in a video image, and tracking the person graphic of the person in the video image according to the number of the person; and in a case that front face information appears in the person graphic in the current image, obtaining the front face information, and determining, according to the front face information, person identity information corresponding to the person graphic in the current image, and binding the person identity information to the number of the person.

The determining whether preset persons allowed to enter the target region include a person corresponding to the person graphic, according to the person identity information corresponding to the person graphic, includes:

in a case that the person graphic intersects with the target region graphic, according to the number of the person corresponding to the person graphic, determining person identity information corresponding the person graphic; and according to the person identity information and identity information of the preset persons, determining whether the preset persons allowed to enter the target region include the person corresponding to the person graphic.

The determining that the person graphic in the current image and the target region graphic meet the predetermined condition, in response to that the preset persons do not include the person corresponding to the person graphic, includes:

in response to that the person identity information is inconsistent with the identity information of the preset persons, determining that the person graphic in the current image and the target region graphic meet the person identity condition in the predetermined condition, and sending the front face information to a background server.

The region management and control method in the embodiment of the present application can extract and clarify front face information of a person who enters the target region illegally, and identify the person who enters the target region illegally. Meanwhile, the region management and control method in the embodiment of the present application can realize second-level settings and function modification, is very flexible, can store related images as evidence, and can also zoom in on human faces to facilitate finding suspicious persons.

Figure 3:
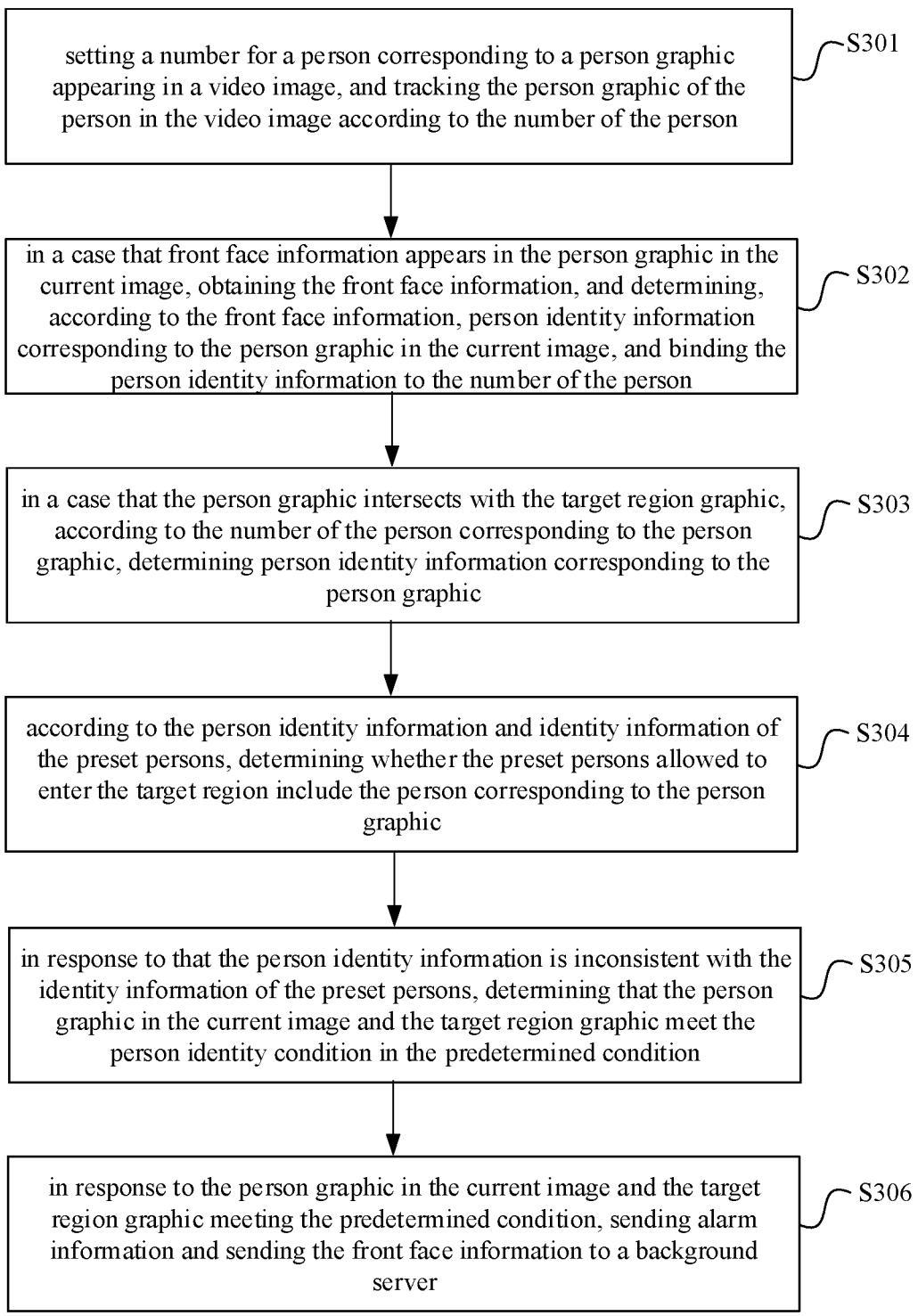
FIG. 3 is a flowchart of an example of sending alarm information when determining that a person graphic in a current image and a target region graphic meet a predetermined condition shown in FIG. 2.

As an example, a flowchart of the step S202 of determining whether a person graphic in the current image and the target region graphic meet a predetermined condition is shown in FIG. 3, and includes steps S301 to S306.

Step S301: setting a number for a person corresponding to a person graphic appearing in a video image, and tracking the person graphic of the person in the video image according to the number of the person.

Optionally, the number ID of the person is always the same. When the person appears in the video image, the person can be numbered, and then, the person can be tracked and re-identified based on the number.

Step S302: in a case that front face information appears in the person graphic in the current image, obtaining the front face information, and determining, according to the front face information, person identity information corresponding to the person graphic in the current image, and binding the person identity information to the number of the person.

Step S303: in a case that the person graphic intersects with the target region graphic, according to the number of the person corresponding to the person graphic, determining person identity information corresponding to the person graphic.

Optionally, the person identity information corresponding to the person's face image is pre-stored in the background.

Optionally, the front face information includes a face image of the person. The person identity information can be identified based on the face image of the person. Judgement of whether the front face information appears in the person graphic in the current image, may employ a threshold to determine whether there is a front face.

Step S304: according to the person identity information and identity information of the preset persons, determining whether the preset persons allowed to enter the target region include the person corresponding to the person graphic.

Step S305: in response to that the person identity information is inconsistent with the identity information of the preset persons, determining that the person graphic in the current image and the target region graphic meet the person identity condition in the predetermined condition.

Step S306: in response to the person graphic in the current image and the target region graphic meeting the predetermined condition, sending alarm information and sending the front face information to a background server.

Optionally, the face image of the front face information may be processed by super-resolution in related technologies. In a case that a size of a detected face image is smaller than a preset value such as 60*60, super-resolution is performed. The front face information may be sent at a predetermined time interval, such as once every 5 seconds. Contents of the sent front face information may include: a camera ID (corresponding to a location) of the image capture device 200, time, a person number ID, a violation category, and a screenshot.

Optionally, in a case that the front face information cannot be recognized or the front face information cannot be obtained, the person identity information of the person graphic in the current image cannot be determined, alarm information is issued, and the front face information is sent to the background.

In some embodiments, the step S202 of determining whether a person graphic in the current image and the target region graphic meet a predetermined condition, includes:

in a predetermined time period, in a case that there is an intersection between the person graphic in the current image and the target region graphic, determining that the person graphic in the current image and the target region graphic meet the time condition in the predetermined condition.

For example, the predetermined time period is off-duty time (17:30-8:30), and no one is allowed to enter the target region during off-duty time. When someone enters the target region, the time condition is met and alarm information is issued.

Optionally, judgment of whether there is an intersection between the person graphic in the current image and the target region graphic may adopt a judging process of space condition.

Optionally, in the region management and control method of the embodiment of the present application, different time conditions may be applied in different predetermined time periods.

In some embodiments, the step S202 of determining whether a person graphic in the current image and the target region graphic meet a predetermined condition, includes:

in a predetermined time period, in a case that there is an intersection between the person graphic in the current image and the target region graphic as well as a person identity condition is met, determining that the person graphic in the current image and the target region graphic meet the time condition and the person identity condition.

For example, the predetermined time period is working hours (8:30-12:00, 13:00-17:30); during this time period, the target region is a leisure area, and the alarm will be triggered only when one person who meets the person identity condition enter the target region. In a case that ordinary employees are not allowed to enter the target region and only property management persons are allowed to enter the target region for cleaning, then, the property management persons are persons who are registered in the system in advance and allowed to enter the target region, that is, the property management persons are in a white list; and the ordinary employees are persons who are registered in the system in advance and prohibited from entering the target region, that is, the ordinary employees are in a blacklist. Person identity information of persons who meet the person identity condition, is in the blacklist. Alternatively, only the white list is set, and in a case that person identity information of one person is not in the white list, then the person identity condition is met.

In some embodiments, the determining whether a person graphic in the current image and the target region graphic meet a predetermined condition, includes:

in a case that there is an intersection between the person graphic in the current image and the target region graphic, determining whether protection component information in the person graphic meets predetermined person protection information;

in response to the protection component information not meeting the predetermined person protection information, determining that the person graphic in the current image and the target region graphic meet the person protection condition.

Optionally, the determining whether protection component information in the person graphic meets predetermined person protection information, includes: inputting the person graphic into a pre-trained classifier, judging whether there is a protection component in the person graphic and forming the protection component information. The protection component information includes that there is a protection component in the person graphic or there is no protection component in the person graphic.

Optionally, the protection component may be a mask, and the protection component information includes wearing a mask and not wearing a mask. Correspondingly, the predetermined person protection information includes wearing a mask and not wearing a mask. According to actual situations, in a case that one person wearing a mask is allowed to enter, the protection component information includes not wearing a mask and the predetermined person protection information includes wearing a mask, then, the protection component information does not meet the predetermined person protection information, and then alarm information will be issued. In a case that the protection component information includes wearing a mask and the predetermined person protection information includes not wearing a mask, then the protection component information does not meet the predetermined person protection information, and then alarm information will be issued.

Optionally, determining the protection component information in the person graphic, includes: inputting a face image in the person graphic into a pre-trained classifier, judging whether the person wears a mask, and forming the protection component information.

In some embodiments, the determining whether a person graphic in the current image and the target region graphic meet a predetermined condition, includes:

determining, among person graphics in the current image, the number of person graphics that intersect with the target region graphic;

in a case that the number of person graphics is greater than a preset person number, determining that the person graphics in the current image and the target region graphic meet the person number condition, and sending alarm information.

Optionally, when persons enter the target region, person graphics are located in an area of the target region graphic, and there is an intersection between the person graphics and the target region graphic. Therefore, the number of persons entering the target region includes persons already in the target region and persons who meet the space condition.

For example, in a case that the preset person number is 3, the number of person graphics that intersect with the target region graphic, is 4, which is greater than the preset person number, then, it is determined that the person graphics in the current image and the target region graphic meet the person number condition, and alarm information is sent.

In some embodiments, the determining whether a person graphic in the current image and the target region graphic meet a predetermined condition, includes:

in a case that there is an intersection between the person graphic in the current image and the target region graphic, determining a body temperature of the person corresponding to the person graphic;

in a case that the body temperature of the person is greater than a body temperature preset value, determining that the person graphics in the current image and the target region graphic meet the person body temperature condition, and sending alarm information.

Optionally, one method of detecting a body temperature of one person may include: using a thermal imaging camera to simultaneously obtain a thermal imaging image and an aligned visible light image, extracting a face area from the visible light image, and then obtaining temperature information of an area in the thermal imaging image corresponding to the face area, thereby realizing body temperature monitoring.

Optionally, the body temperature preset value is 37.5° C. (degrees Celsius). In a case that a body temperature of one person entering the target region is greater than 37.5°, it is determined that the person graphic in the current image and the target region graphic meet the person body temperature condition, and alarm information is sent.

In some embodiments, the obtaining a current image in a video image and a target region graphic included in the current image, includes:

according to an identifier of the target region in the current image of the video image, determining the target region graphic in the current image; or, obtaining an editing operation on the current image of the video image, and taking an area selected by the editing operation as the target region graphic.

Optionally, the identifier of the target region is preset by pasting a tape of a specific color on the ground in advance, and using the camera of the region management and control apparatus 100 to automatically obtain an outline of the target region through color segmentation and Hough transform, thereby obtaining a position of the target region in the image and then obtaining the target region graphic.

Optionally, the editing operation on the current image includes: displaying a camera image in real time on a display interface of the display device, and using a graphics processor in the related technology to automatically select the target region, or manually selecting the target region with a mouse via editing operations such as clicking or dragging.

Figure 4:
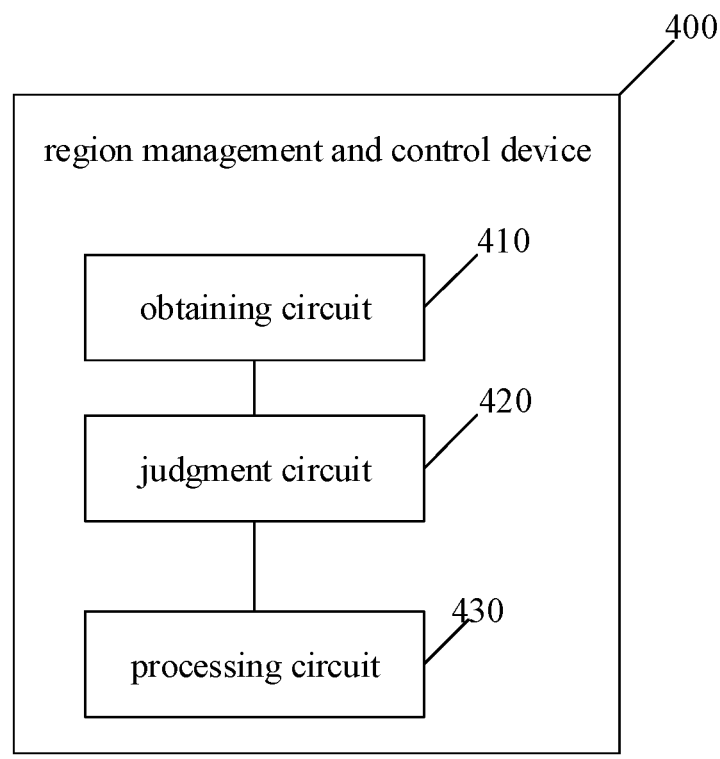
FIG. 4 is a schematic diagram of a region management and control device according to an embodiment of the present application.

Based on the same inventive concept, one embodiment of the present application provides a region management and control device. As shown in FIG. 4, the region management and control device 400 includes an obtaining circuit 410, a judgment circuit 420, and a processing circuit 430.

The obtaining circuit 410 is configured to obtain a current image in a video image and a target region graphic included in the current image.

The judgment circuit 420 is configured to determine whether a person graphic in the current image and the target region graphic meet a predetermined condition. The predetermined condition includes at least one of: a space condition, a person identity condition, a time condition, a person protection condition, a person number condition or a person body temperature condition.

The processing circuit 430 is configured to send alarm information in response to the person graphic in the current image and the target region graphic meeting the predetermined condition.

Optionally, the judgment circuit 420 is configured to determine a minimum enclosing rectangle of the person graphic in the current image, where the minimum enclosing rectangle is a minimum rectangle containing the person graphic in the current image; and, determine that the person graphic in the current image and the target region graphic meet the space condition, in a case that there is an intersection between the minimum enclosing rectangle and the target region graphic.

Optionally, the judgment circuit 420 is configured to determine person identity information of the person graphic in the current image; in a case that there is an intersection between the person graphic and the target region graphic, according to the person identity information corresponding to the person graphic, determine whether preset persons allowed to enter the target region include a person corresponding to the person graphic; and, in response to that the preset persons do not include the person corresponding to the person graphic, determine that the person graphic in the current image and the target region graphic meet the predetermined condition.

Optionally, the judgment circuit 420 is configured to set a number for a person corresponding to a person graphic appearing in a video image, and track the person graphic of the person in the video image according to the number of the person; and, in a case that front face information appears in the person graphic in the current image, obtain the front face information, and determine, according to the front face information, person identity information corresponding to the person graphic in the current image, and bind the person identity information to the number of the person.

Optionally, the judgment circuit 420 is configured to, in a case that the person graphic intersects with the target region graphic, according to the number of the person corresponding to the person graphic, determine person identity information corresponding the person graphic; and, according to the person identity information and identity information of the preset persons, determine whether the preset persons allowed to enter the target region include the person corresponding to the person graphic.

Optionally, the judgment circuit 420 is configured to, in response to that the person identity information is inconsistent with the identity information of the preset persons, determine that the person graphic in the current image and the target region graphic meet the person identity condition in the predetermined condition.

Optionally, the processing circuit 430 is configured to, in response to that the person graphic in the current image and the target region graphic meet the person identity condition in the predetermined condition, send out alarm information and send the front face information to a background server.

Optionally, the judgment circuit 420 is configured to, in a predetermined time period, in a case that there is an intersection between the person graphic in the current image and the target region graphic, determine that the person graphic in the current image and the target region graphic meet the time condition in the predetermined condition.

Optionally, the judgment circuit 420 is configured to, in a predetermined time period, in a case that there is an intersection between the person graphic in the current image and the target region graphic as well as a person identity condition is met, determine that the person graphic in the current image and the target region graphic meet the time condition and the person identity condition.

Optionally, the judgment circuit 420 is configured to, in a case that there is an intersection between the person graphic in the current image and the target region graphic, determine whether protection component information in the person graphic meets predetermined person protection information; in response to the protection component information not meeting the predetermined person protection information, determine that the person graphic in the current image and the target region graphic meet the person protection condition.

Optionally, the judgment circuit 420 is configured to, determine, among person graphics in the current image, the number of person graphics that intersect with the target region graphic; in a case that the number of person graphics is greater than a preset person number, determine that the person graphics in the current image and the target region graphic meet the person number condition, and send alarm information.

Optionally, the judgment circuit 420 is configured to, in a case that there is an intersection between the person graphic in the current image and the target region graphic, determine a body temperature of the person corresponding to the person graphic; in a case that the body temperature of the person is greater than a body temperature preset value, determine that the person graphics in the current image and the target region graphic meet the person body temperature condition, and sending alarm information.

Optionally, the obtaining circuit 410 is configured to, according to an identifier of the target region in the current image of the video image, determine the target region graphic in the current image; or, obtain an editing operation on the current image of the video image, and take an area selected by the editing operation as the target region graphic.

Based on the same inventive concept, one embodiment of the present application provides a region management and control apparatus 100, including:
 a processor;
 a memory in communication with the processor;
 at least one program stored in the memory and configured to be executed by the processor, where the at least one program is configured to implement the region management and control method in any embodiment of the present application.

Those skilled in the art can understand that an electronic device provided in the embodiments of the present application may be specially designed and manufactured for required purposes, or may also include known equipment in a general-purpose computer. These devices include computer programs stored therein, which are selectively activated or reconfigured. Such computer programs may be stored in a readable medium of a device (for example, computer) or may be stored in any type of medium suitable for storing electronic instructions and respectively coupled to a bus.

Figure 5:
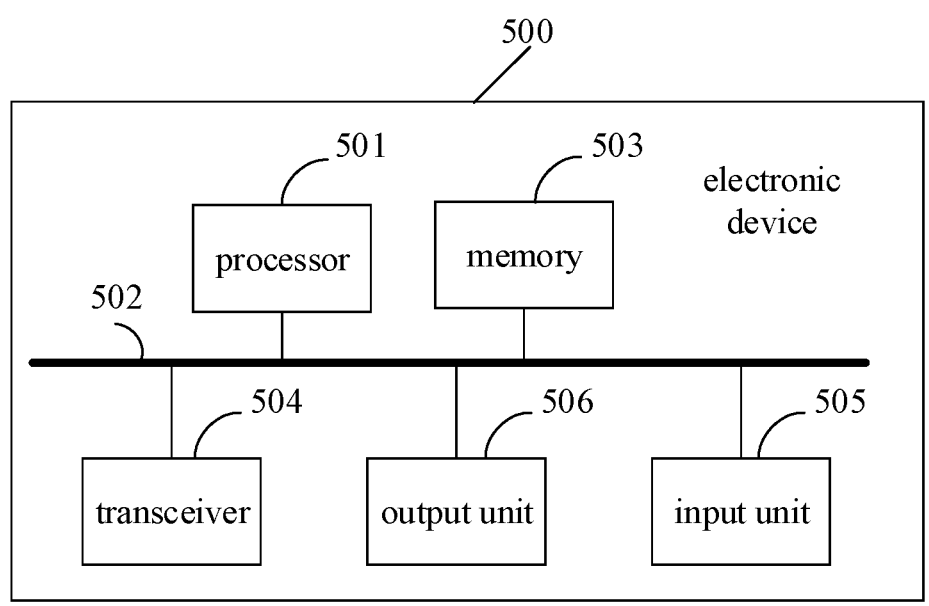
FIG. 5 is a schematic diagram of a region management and control apparatus according to an embodiment of the present application.

One embodiment of the present application provides an electronic device. As shown in FIG. 5, the electronic device 500 shown in FIG. 5 includes a processor 501 and a memory 503. The processor 501 and the memory 503 are communicatively connected, such as connected via a bus 502.

The processor 501 may be a central processing unit (CPU), a general-purpose processor, a data signal processor (DSP), an application specific integrated circuit (ASIC), a field-programmable gate array or other programmable logic devices, transistor logic devices, hardware components or any combination thereof. It can implement or execute various exemplary logical blocks, modules and circuits described in conjunction with the disclosure of the present application. The processor 501 may also be a combination that implements computing functions, for example, including a combination of one or more microprocessors, a combination of a DSP and a microprocessor, and so on.

The bus 502 may include a path for transferring information between the foregoing components. The bus 502 may be a peripheral component interconnect (PCI) bus, or, an extended industry standard architecture (EISA) bus or the like. The bus 502 may be divided into an address bus, a data bus, a control bus, and so on. For ease of representation, only one thick line in FIG. 5 is used to represent the bus, but it does not mean that there is only one bus or one type of bus.

The memory 503 may be a read-only memory (ROM) or other types of static storage devices that can store static information and instructions, a random access memory (RAM) or other types of dynamic storage devices that can store static information and instructions, an electrically erasable programmable read only memory (EEPROM), a compact disc read-only memory (CD-ROM) or other optical disk storage, optical disc storage (including compact discs, laser discs, optical discs, digital versatile discs, Blu-ray discs, etc.), magnetic disk storage media or other magnetic storage devices, or any other medium that can be used to carry or store desired program codes in the form of instructions or data structures and that can be accessed by a computer, but not limited to this.

Optionally, the electronic device 500 may further include a transceiver 504. The transceiver 504 may be used for signal reception and transmission. The transceiver 504 may allow the electronic device 500 to perform wireless or wired communication with other devices to exchange data. It should be noted that in actual applications, the number of transceivers 504 is not limited to one.

Optionally, the electronic device 500 may further include an input unit 505. The input unit 505 may be used to receive input numbers, characters, images, and/or sound information, or generate key signal inputs related to user settings and function control of the electronic device 500. The input unit 505 may include, but is not limited to, one or more of a touch screen, a physical keyboard, function keys (such as volume control buttons, switch buttons, etc.), a trackball, a mouse, a joystick, a camera, and a sound pickup.

Optionally, the electronic device 500 may further include an output unit 506. The output unit 506 may be used to output or display information processed by the processor 501. The output unit 506 may include, but is not limited to, one or more of a display device, a speaker, a vibration device, and the like.

Although FIG. 5 shows the electronic device 500 having various devices, it should be understood that it is not required to implement or have all of the illustrated devices. It may alternatively be implemented or provided with more or fewer devices.

Optionally, the memory 503 is used to store application program codes for executing the solutions of the present application under control of the processor 501. The processor 501 is configured to execute the application program codes stored in the memory 503 to implement the region management and control method provided in any embodiment of the present application.

Based on the same inventive concept, one embodiment of the present application provides a non-transitory computer readable storage medium. The non-transitory computer readable storage medium is used to store computer instructions. When the computer instructions run on the region management and control apparatus 100, the region management and control method provided in any embodiment of the present application is implemented.

Those skilled in the art can understand that steps, measures, or solutions in various operations, methods or processes that have been discussed in the present disclosure may be alternated, changed, combined, or deleted. Further, other steps, measures, or solutions in various operations, methods or processes that have been discussed in the present disclosure can be alternated, modified, rearranged, decomposed, combined, or deleted. Further, steps, measures, or solutions in various operations, methods or processes in the conventional technologies can be alternated, modified, rearranged, decomposed, combined, or deleted.

In the descriptions of the present disclosure, it needs to be understood that orientation or positional relationship indicated by the term of "center", "up", "down", "front", "rear", "left", "right", "vertical", "horizontal", "top", "bottom", "inside", or "outer", etc., is based on the drawings, and are only for the convenience of describing the present disclosure and simplifying the description, and not intended to indicate or imply that the device or element as referred to must have a specific orientation or be constructed and operated in a specific orientation, and therefore cannot be understood as a limitation to the present disclosure.

The terms "first" and "second" are used for descriptive purposes only, and cannot be understood as indicating or implying relative importance or implicitly indicating the quantity of technical features as referred to. Therefore, the features defined by "first" and "second" may explicitly or implicitly include one or more of the features. In the descriptions of the present disclosure, unless otherwise stated, "a plurality" means two or more.

In the description of the present disclosure, it should be noted that the term of "installation", "connected", or "connecting" should be understood in a broad sense unless explicitly stated and limited. For example, it may be fixed or removable connection, or may be integral connection; it may be direct connection or indirect connection through an intermediate medium, or, it may be internal communication of two elements. For those of ordinary skill in the art, the specific meanings of the above terms in the present disclosure may be understood on a case-by-case basis.

In the descriptions of this specification, specific features, structures, materials, or characteristics may be combined in a suitable manner in any one or more embodiments or examples.

It should be understood that although the steps in the flowchart of the drawings are sequentially displayed in accordance with the directions of the arrows, these steps are not necessarily performed in the order indicated by the arrows. Unless explicitly stated herein, the execution of these steps is not strictly limited, and they may be performed in other orders. Moreover, at least a part of the steps in the flowchart of the drawings may include multiple sub-steps or multiple stages. These sub-steps or stages are not necessarily performed at the same time, but may be performed at different times; and they are not necessarily performed sequentially, but may be performed in turn or alternately with other steps or at least a part of sub-steps or stages of other steps.

The above descriptions are merely some embodiments of the present disclosure. It should be noted that for those of ordinary skill in the art, without departing from the principles of the present disclosure, various improvements and modifications can be made. These improvements and modifications should fall within the protection scope of the present disclosure.

What is claimed is:

1. A region management and control method, comprising:
obtaining a current image in a video image and a target region graphic included in the current image;
determining whether a person graphic in the current image and the target region graphic meet a predetermined condition; and
sending alarm information in response to the person graphic in the current image and the target region graphic meeting the predetermined condition;
wherein the predetermined condition includes at least one of: a space condition, a person identity condition, a time condition, a person protection condition, a person number condition or a person body temperature condition;
wherein the determining whether a person graphic in the current image and the target region graphic meet a predetermined condition, includes:
determining person identity information of the person graphic in the current image;
in a case that there is an intersection between the person graphic and the target region graphic, determining, according to the person identity information corresponding to the person graphic, whether preset persons allowed to enter the target region include a person corresponding to the person graphic; and
determining that the person graphic in the current image and the target region graphic meet the person identity condition, in response to that the preset persons do not include the person corresponding to the person graphic;
wherein the determining person identity information of the person graphic in the current image, includes:
setting a number for the person corresponding to the person graphic appearing in the video image, and tracking the person graphic of the person in the video image according to the number of the person; and
in a case that front face information appears in the person graphic in the current image, obtaining the front face information, and determining, according to the front face information, the person identity information corresponding to the person graphic in the current image, and binding the person identity information to the number of the person;
wherein the determining, according to the person identity information corresponding to the person graphic, whether preset persons allowed to enter the target region include a person corresponding to the person graphic, includes:
in a case that the person graphic intersects with the target region graphic, according to the number of the person corresponding to the person graphic, determining the person identity information corresponding the person graphic; and
according to the person identity information and identity information of the preset persons, determining whether the preset persons allowed to enter the target region include the person corresponding to the person graphic;
wherein the determining that the person graphic in the current image and the target region graphic meet the person identity condition, in response to that the preset persons do not include the person corresponding to the person graphic, includes:
in response to that the person identity information is inconsistent with the identity information of the preset persons, determining that the person graphic in the current image and the target region graphic meet the person identity condition in the predetermined condition;
wherein the sending alarm information in response to the person graphic in the current image and the target region graphic meeting the predetermined condition, includes:
in response to that the person graphic in the current image and the target region graphic meet the person identity condition in the predetermined condition, sending the alarm information and sending the front face information to a background server.

2. The method according to claim 1, wherein the determining whether a person graphic in the current image and the target region graphic meet a predetermined condition, further includes:
   determining a minimum enclosing rectangle of the person graphic in the current image; wherein the minimum enclosing rectangle is a minimum rectangle containing the person graphic in the current image; and
   in a case that there is an intersection between the minimum enclosing rectangle and the target region graphic, determining that the person graphic in the current image and the target region graphic meet the space condition.

3. The method according to claim 1, wherein the determining whether a person graphic in the current image and the target region graphic meet a predetermined condition, further includes:
   in a predetermined time period, in a case that there is an intersection between the person graphic in the current image and the target region graphic, determining that the person graphic in the current image and the target region graphic meet the time condition in the predetermined condition; or,
   in a predetermined time period, in a case that there is an intersection between the person graphic in the current image and the target region graphic as well as the person identity condition is met, determining that the person graphic in the current image and the target region graphic meet the time condition and the person identity condition.

4. The method according to claim 1, wherein the determining whether a person graphic in the current image and the target region graphic meet a predetermined condition, further includes:
   in a case that there is an intersection between the person graphic in the current image and the target region graphic, determining whether protection component information in the person graphic meets predetermined person protection information;
   in response to the protection component information not meeting the predetermined person protection information, determining that the person graphic in the current image and the target region graphic meet the person protection condition.

5. The method according to claim 1, wherein the determining whether a person graphic in the current image and the target region graphic meet a predetermined condition, further includes:
   determining, among person graphics in the current image, the number of person graphics that intersect with the target region graphic;
   in a case that the number of person graphics is greater than a preset person number, determining that the person graphics in the current image and the target region graphic meet the person number condition.

6. The method according to claim 1, wherein the determining whether a person graphic in the current image and the target region graphic meet a predetermined condition, further includes:
   in a case that there is an intersection between the person graphic in the current image and the target region graphic, determining a body temperature of a person corresponding to the person graphic;
   in a case that the body temperature of the person is greater than a body temperature preset value, determining that the person graphics in the current image and the target region graphic meet the person body temperature condition.

7. The method according to claim 1, wherein the obtaining a current image in a video image and a target region graphic included in the current image, includes:
   according to an identifier of the target region in the current image of the video image, determining the target region graphic in the current image; or,
   obtaining an editing operation on the current image of the video image, and taking an area selected by the editing operation as the target region graphic.

8. A region management and control apparatus, comprising:
   a processor;
   a memory in communication with the processor; and
   at least one program stored in the memory and configured to be executed by the processor;
   wherein the at least one program is configured to implement:
   obtaining a current image in a video image and a target region graphic included in the current image;
   determining whether a person graphic in the current image and the target region graphic meet a predetermined condition; and
   sending alarm information in response to the person graphic in the current image and the target region graphic meeting the predetermined condition;
   wherein the predetermined condition includes at least one of: a space condition, a person identity condition, a time condition, a person protection condition, a person number condition or a person body temperature condition;
   wherein the processor executes the at least one program to implement:
   determining person identity information of the person graphic in the current image;
   in a case that there is an intersection between the person graphic and the target region graphic, determining, according to the person identity information corresponding to the person graphic, whether preset persons allowed to enter the target region include a person corresponding to the person graphic; and
   determining that the person graphic in the current image and the target region graphic meet the person identity condition, in response to that the preset persons do not include the person corresponding to the person graphic;
   wherein the processor executes the at least one program to implement:
   setting a number for the person corresponding to the person graphic appearing in the video image, and tracking the person graphic of the person in the video image according to the number of the person; and
   in a case that front face information appears in the person graphic in the current image, obtaining the front face information, and determining, according to the front face information, the person identity information corresponding to the person graphic in the current image, and binding the person identity information to the number of the person;
   wherein when determining, according to the person identity information corresponding to the person graphic, whether preset persons allowed to enter the target region include a person corresponding to the person graphic, the processor executes the at least one program to implement:
in a case that the person graphic intersects with the target region graphic, according to the number of the person corresponding to the person graphic, determining the person identity information corresponding the person graphic; and
according to the person identity information and identity information of the preset persons, determining whether the preset persons allowed to enter the target region include the person corresponding to the person graphic;
wherein when determining that the person graphic in the current image and the target region graphic meet the person identity condition, in response to that the preset persons do not include the person corresponding to the person graphic, the processor executes the at least one program to implement:
in response to that the person identity information is inconsistent with the identity information of the preset persons, determining that the person graphic in the current image and the target region graphic meet the person identity condition in the predetermined condition;
wherein when sending alarm information in response to the person graphic in the current image and the target region graphic meeting the predetermined condition, the processor executes the at least one program to implement:
in response to that the person graphic in the current image and the target region graphic meet the person identity condition in the predetermined condition, sending the alarm information and sending the front face information to a background server.

9. The apparatus according to claim 8, wherein the processor executes the at least one program to implement:
determining a minimum enclosing rectangle of the person graphic in the current image; wherein the minimum enclosing rectangle is a minimum rectangle containing the person graphic in the current image; and
in a case that there is an intersection between the minimum enclosing rectangle and the target region graphic, determining that the person graphic in the current image and the target region graphic meet the space condition.

10. The apparatus according to claim 8, wherein the processor executes the at least one program to implement:
in a predetermined time period, in a case that there is an intersection between the person graphic in the current image and the target region graphic, determining that the person graphic in the current image and the target region graphic meet the time condition in the predetermined condition; or, in a predetermined time period, in a case that there is an intersection between the person graphic in the current image and the target region graphic as well as the person identity condition is met, determining that the person graphic in the current image and the target region graphic meet the time condition and the person identity condition.

11. The apparatus according to claim 8, wherein the processor executes the at least one program to implement:
in a case that there is an intersection between the person graphic in the current image and the target region graphic, determining whether protection component information in the person graphic meets predetermined person protection information;
in response to the protection component information not meeting the predetermined person protection information, determining that the person graphic in the current image and the target region graphic meet the person protection condition.

12. The apparatus according to claim 8, wherein the processor executes the at least one program to implement:
determining, among person graphics in the current image, the number of person graphics that intersect with the target region graphic;
in a case that the number of person graphics is greater than a preset person number, determining that the person graphics in the current image and the target region graphic meet the person number condition.

13. The apparatus according to claim 8, wherein the processor executes the at least one program to implement:
in a case that there is an intersection between the person graphic in the current image and the target region graphic, determining a body temperature of a person corresponding to the person graphic;
in a case that the body temperature of the person is greater than a body temperature preset value, determining that the person graphics in the current image and the target region graphic meet the person body temperature condition.

14. The apparatus according to claim 8, wherein the processor executes the at least one program to implement:
according to an identifier of the target region in the current image of the video image, determining the target region graphic in the current image; or,
obtaining an editing operation on the current image of the video image, and taking an area selected by the editing operation as the target region graphic.

15. A non-transitory computer readable storage medium, comprising a computer program stored thereon; wherein the computer program runs on a region management and control apparatus to implement the method according to claim 1.

* * * * *